United States Patent [19]

Huff

[11] 4,095,644
[45] Jun. 20, 1978

[54] COOLING SYSTEM FOR GEAR REDUCERS

[75] Inventor: Robert O. Huff, Columbus, Ind.

[73] Assignee: Reliance Electric Company, Columbus, Ind.

[21] Appl. No.: 740,353

[22] Filed: Nov. 10, 1976

[51] Int. Cl.² ............................................. F28F 27/00
[52] U.S. Cl. ........................................ 165/13; 165/38; 165/39; 184/6.1; 184/6.22
[58] Field of Search ..................... 165/37, 40, 38, 35, 165/36, 13, 39; 184/6.21, 6.1, 104 R, 104 B, 6.22

[56] References Cited

U.S. PATENT DOCUMENTS

| | | | |
|---|---|---|---|
| 1,902,970 | 3/1933 | Ramsaur et al. | 184/104 R |
| 2,008,164 | 7/1935 | Wolf | 165/35 X |
| 2,278,992 | 4/1942 | Henderson | 184/6.22 X |
| 2,433,420 | 12/1947 | Booth | 165/37 |
| 2,460,754 | 2/1949 | Kidd | 165/38 |
| 2,476,405 | 7/1949 | Dilworth | 165/38 |
| 2,480,120 | 8/1949 | Cruzan | 165/37 |
| 2,512,189 | 6/1950 | Waterman | 165/38 X |
| 3,743,011 | 7/1973 | Frost | 165/38 |

*Primary Examiner*—David H. Brown

*Attorney, Agent, or Firm*—Marmaduke A. Hobbs

[57] ABSTRACT

A cooling system for gear reducers having a housing with a lubricant therein, in which a motor for the pump and heat exchanger are mounted on a base structure to form a unitary assembly which can be fully assembled in the manufacturing plant and delivered to and installed at the site of the gear reducer. The temperature of the lubricant in the line from the gear reducer to the pump is sensed by a temperature responsive device and a control valve in the coolant line is regulated thereby for producing an intermittent flow to control the efficiency of the heat exchanger and thereby regulate the temperature of the lubricant in a predetermined range. A second temperature responsive device may be utilized to sense the temperature of the lubricant in the hot lubricant line and to shut down the equipment in the event the temperature of the lubricant, and consequently the temperature of the gear reducer, exceeds a predetermined value. A by-pass line having a relief valve may be included between the hot lubricant line and the return line to by-pass the lubricant around the heat exchanger in the event the flow through the heat exchanger becomes restricted and the pressure in the hot lubricant tends to become excessively high.

10 Claims, 4 Drawing Figures

COOLING SYSTEM FOR GEAR REDUCERS

Conventional gear reducers, particularly those of relatively large size, tend to generate an appreciable amount of the heat from the friction between the gears, thus reducing the efficiency of the reducers, and occasionally causing damage and possibly requiring frequent servicing and sometimes substantial repairs. If the temperature of the lubricant in the reducers becomes excessively high, the bearings may expand, gear mesh clearances may decrease, and the lubricating characteristics may be diminished, thus resulting in a relatively short life of the equipment. Hence, in order to maintain the reducers in optimum operating condition and at full mechanical rating over extended periods of time, cooling systems are employed which either directly or indirectly maintain the temperature of the moving parts within an acceptable operating temperature range. One type consists of a fan or blower mounted or connected to the input shaft for creating an air flow around a finned housing for dissipating the heat, thus indirectly cooling the lubricant and gears within the housing. Another type utilizes a cooling system for cooling the lubricant of the reducer by circulating the lubricant from the reducer housing through the heat exchanger and then returning the cooled lubricant to the reducer where it cools and maintains the gears and other moving parts at optimum operating performance. While the fan or blower types are usually preferred, in that they are less expensive, require less space and are more reliable than the heat exchangers used in the past, they are of limited capacity and less efficient than the aforementioned heat exchanger type. It is therefore one of the principal objects of the present invention to provide a lubricant cooling, heat exchanger type device for gear reducers, which is so constructed and designed that it can be installed as a complete unit with only the connections to the reducer and to a coolant source being required to place the unit in operation, and which can be placed at a convenient space-saving location in the vicinity of the reducer without diminishing the efficiency of the unit.

Another object of the invention is to provide a lubricant cooling, heat exchanger unit for gear reducers, in which the lubricant is constantly circulated through the exchanger and the temperature of the lubricant maintained within an acceptable operating range by controlling the flow of coolant, and in which the gear reducer is protected from excess heat and/or pressure in the event the equipment malfunctions, by means sensing the elevated temperature and turning off the power input to the reducer, and by means sensing the excess pressure and by-passing the lubricant around the heat exchanger.

Still another object of the invention is to provide a cooling system of the aforesaid type which is relatively simple in construction and operation and requires little or no servicing for optimum performance over long periods of operation, and which utilizes water as the coolant under such conditions of operation that a minimum amount is required for efficient, closely controlled performance.

A further object of the invention is to provide a highly versatile, easily maintained heat exchange unit for the lubricant of gear reducers, which can be used with different size gear reducers without any substantial changes being required from one reducer to another, and which can be manufactured and shipped as a package ready for installation.

Additional objects and advantages of the invention will become apparent from the following description and accompanying drawings, wherein.

Figure 1:
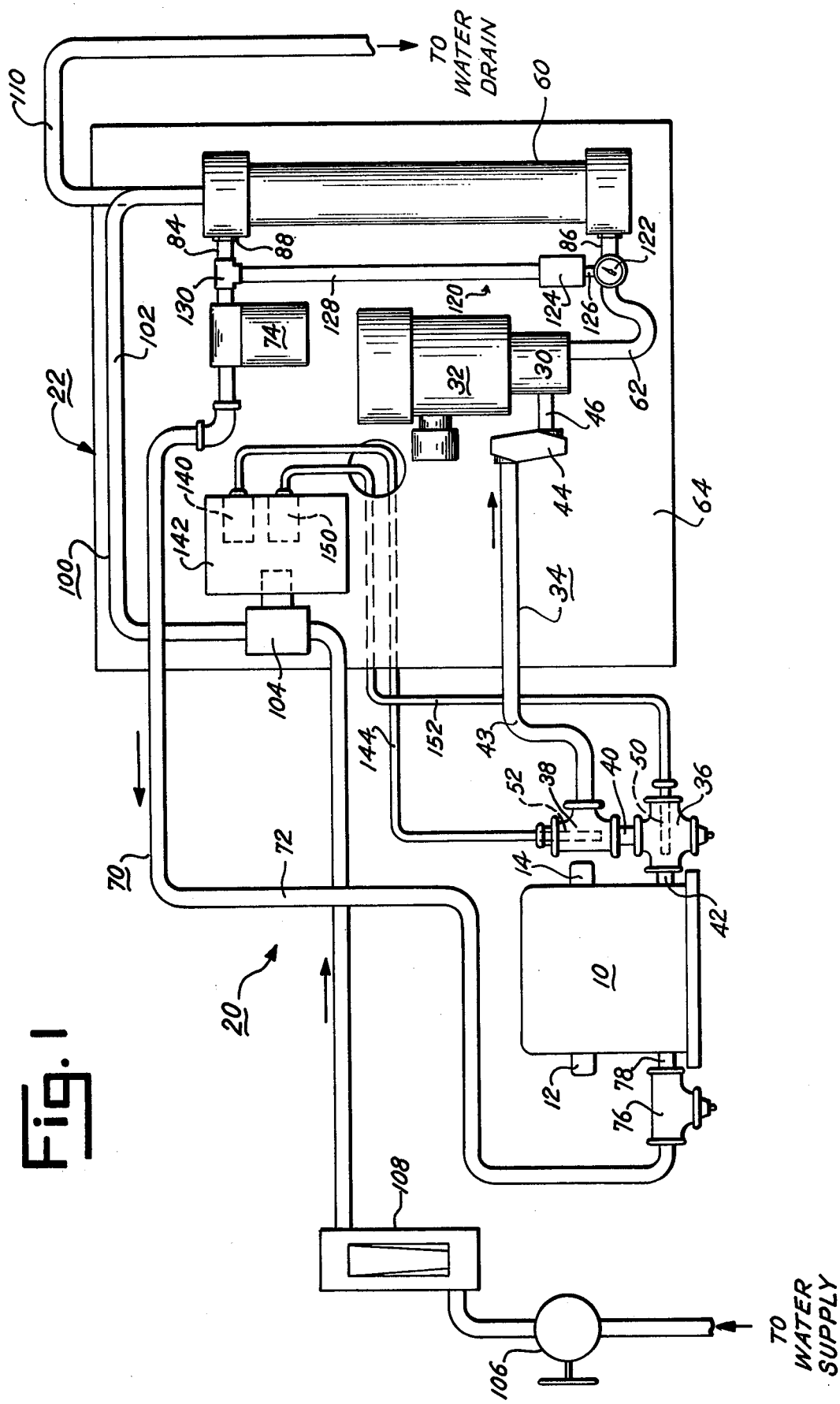
FIG. 1 is a generally schematic, elevational view of a gear reducer and a cooling system connected thereto, embodying the present invention.
Figure 2:
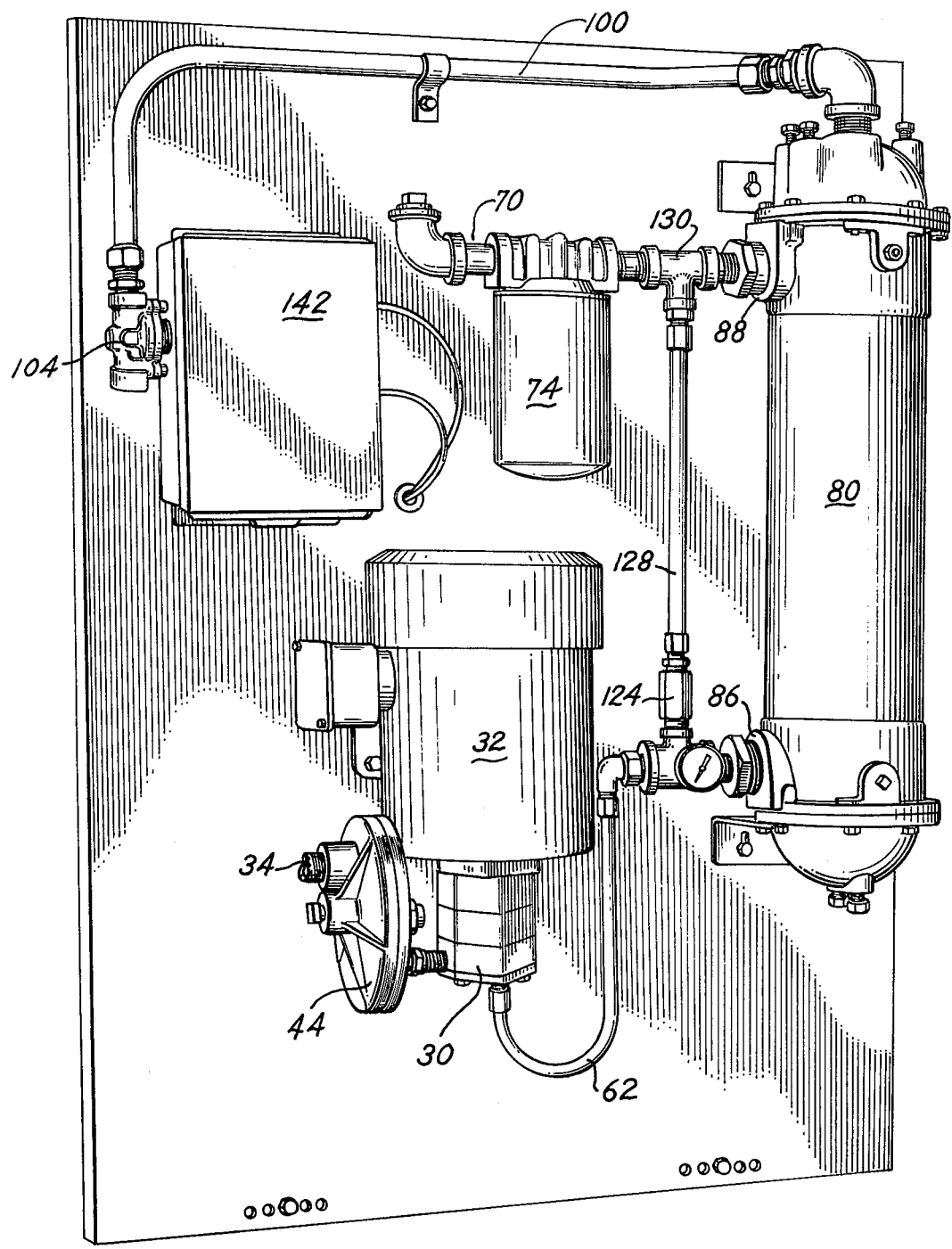
FIG. 2 is a perspective view of the principal part of the cooling system shown in FIG. 1.
Figure 3:
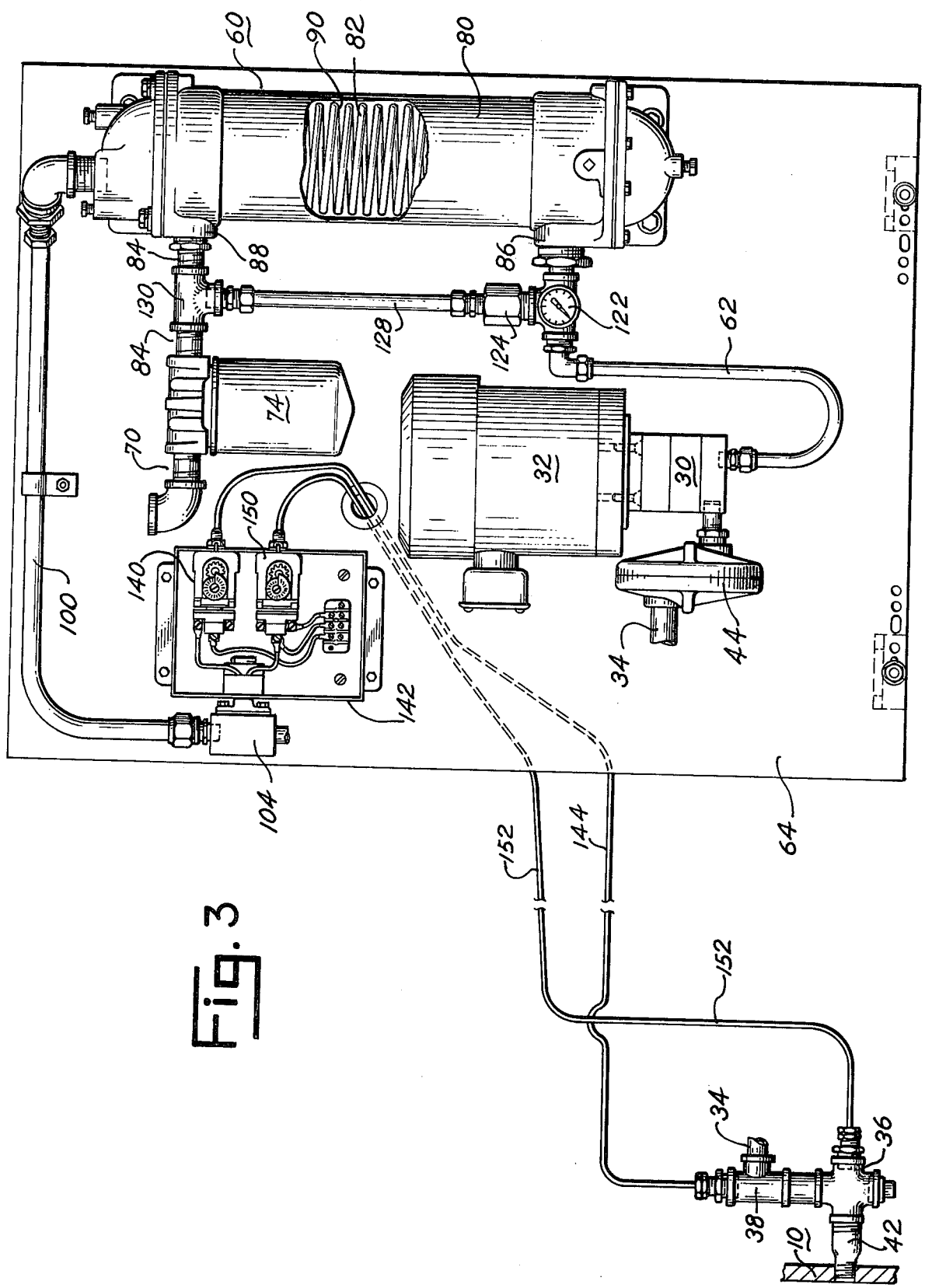
FIG. 3 is a front elevational view of the cooling system for gear reducers shown in FIGS. 1 and 2, with portions thereof being broken away to show several of the parts in greater detail.
Figure 4:
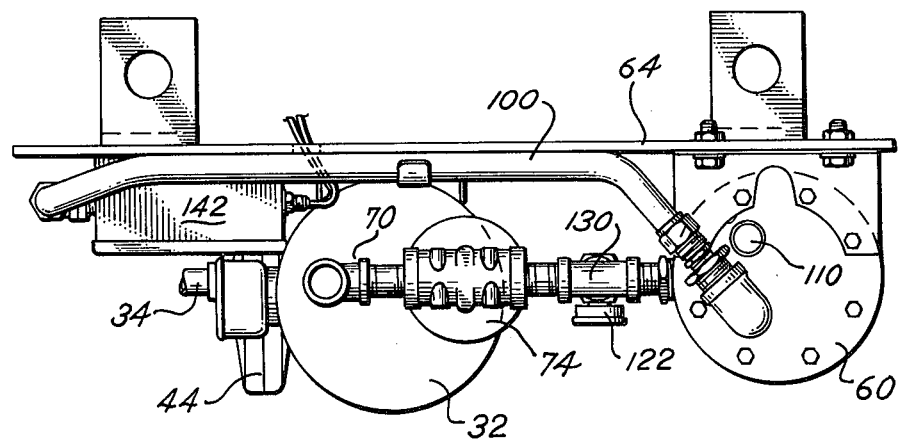
FIG. 4 is a top plan view of the principal part of the cooling system shown in FIG. 2.

Referring more specifically to the drawings and to FIG. 1 in particular, numeral 10 indicates generally a gear reducer of the concentric shaft type, the input and output shafts being indicated as numerals 12 and 14. Numeral 20 indicates generally a complete cooling system for maintaining acceptable operating temperatures in the reducer, and numeral 22 indicates the principal unit assembly of the system which is adapted to be used in any one of a number of locations around the gear reducer, and may be spaced remotely therefrom if the installation is such that the cooling system cannot conveniently be placed in close proximity to the reducer. The particular reducer shown is for illustrative purposes only, since the present cooling system and unit assembly can be used in conjunction with a number of different types of gear reducers in which the lubricant can be withdrawn from the reducer housing and cooled and returned to the housing where it maintains the temperature of the moving parts such as gears, bearings and shafts at optimum operating temperature. The cooling system is connected to a lubricant sump in the housing of the reducer and normally returns the oil to the sump at some point in the housing remote from the outlet of the sump.

Unit 22 includes a pump 30 driven by a motor 32, the pump being connected to the sump of the gear reducer by a fluid line 34 having a pipe cross 36 and pipe tee 38 connected to one another by nipple 40. Pipe cross 36 is connected to the reducer by a nipple 42, the tee being connected to pump 30 by a pipe 43, filter 44 and nipple 46. Specific details and arrangements of line 34 are not critical and may be changed from one installation to another; however, the cross and tee are used for temperature sensors 50 and 52, the purposes of which will be explained in greater detail hereinafter. The pump is connected to heat exchanger 60 by a line 62, and the heat exchanger, pump and motor are mounted on a rigid steel panel 64 which permits these components, together with the other components thereon, to be assembled in the manufacturing plant, shipped and installed as a unit. The upper end of the heat exchanger is connected to the gear reducer by a fluid line 70, consisting of pipe 72, filter 74, pipe tee 76 and nipple 78 connecting the tee to the reducer housing. The heat exchanger may be of various types of construction, the one shown consisting of a cylindrical casing 80 having coils 82, the lower end of the exchanger being connected to line 62 and the upper end being connected to section 84 of return line 70. The lubricant flows from the inlet 86 through the coils, preferably consisting of copper tubing, to outlet 88 at the top.

A chamber 90 for the coolant fluid is disposed in the casing and is connected to a source of water under pressure, such as a city water system, by a line generally indicated by numeral 100 and consisting of a pipe 102, solenoid drive 104, and manual control valve 106. A flow meter 108 may be included if desired so that the amount of water being used at any particular time can be determined and the system adjusted to obtain the most economical performance within the acceptable operating temperature range. The water inlet pipe in the heat exchanger normally extends downwardly through chamber 90 to the lower part thereof where the cool water is discharged, and the upper part of the chamber is connected to a drain by a line 110 which permits the warm water from the chamber to flow freely therefrom while the system is in operation. A system 120 for by-passing the heat exchanger is preferably included to protect the system, particularly the heat exchanger, in the event the line through the heat exchanger is in any way obstructed. The system 120 consists of a pressure gauge 122, a relief valve 124 of conventional construction, and a pipe nipple 126 connecting the relief valve to pipe 62, and a pipe 128 connecting the relief valve to a tee 130 in pipe section 84. When the fluid in the heat exchanger and pipe 62 reaches a predetermined maximum pressure, relief valve 124 opens, by-passing the fluid directly to return line 70.

One of the primary features of the present system is the construction which permits control of the system so that the lubricant is constantly circulated through the cooling system and the temperature thereof is controlled by regulating an intermittent flow of water through the cooling system. The solenoid valve 104 is controlled by a thermostat 140 mounted in a box 142 and connected by a tube 144 to temperature sensor 52 in hot lubricant line 34 at tee 38. The thermostat is set by the dial thereon to preselected maximum and minimum temperatures to maintain an optimum operating range in the lubricant for cooling the various components of the speed reducer. The temperature at which the thermostat 140 is set normally is substantially below the maximum temperature which can be reached without damaging the speed reducer or the cooling system. A second thermostat 150 mounted in box 142 is preferably included for the purpose of preventing excess temperatures from damaging the reducer or system, this thermostat being connected to sensor 50 in cross 36 by tube 152. Thermostat 150 is set, regulating the dial thereon, and operates to shut off the motor driving the reducer, and preferably also to shut down the coolant system, including the water line, by shutting off solenoid valve 104. However, the cooling system may be permitted to operate to assist in reducing the temperature of the reducer even though the reducer is not operating.

In the operation of the cooling system just described, with the gear reducer 10 operating and motor 32 driving pump 30, lubricant is withdrawn from the sump of the reducer through line 34 and filter 44 by pump 30 and is then forced through pipe 62 to and through heat exchanger 60, and returned to the sump through filter 74 and line 70. When the system is started, hand valve 106 is opened, thus permitting solenoid valve 104 to control the flow of water through the coolant system. When the temperature of the lubricant rises to a predetermined setting on thermostat 140, as sensed through sensor 52 in line 34, the solenoid valve is opened, thereby permitting water to circulate through chamber 90 of heat exchanger 60. The water continues to circulate through the heat exchanger until the temperature of the lubricant is lowered to the minimum temperature of the operating range, at which time the thermostat 140 shuts off solenoid valve 104. This repeated off and on operation is continued throughout the operation of the cooling system, with the temperature of the lubricant varying within the predetermined minimum and maximum temperatures as controlled by thermostat 140, the range being the optimum operating range for the gear reducer. In the event flow of fluid through the heat exchanger is restricted by an obstruction sufficiently to increase the pressure in line 62 above acceptable limits, relief valve 124 opens and by-passes fluid through the by-pass system 120. Since no effective cooling takes place while the fluid is being by-passed through the system, the temperature will normally increase, possibly above the maximum for the normal operating range. The thermostat 150, through sensor 50, senses an increase in temperature, and when the predetermined maximum safe temperature is reached, the thermostat, through circuitry not shown, interrupts the operation of the motor driving the gear reducers and may, if desired, simultaneously shut down all the equipment in which the reducer operates. After the gear reducer and/or cooling system has been repaired and/or serviced, the system is again reset for operation in the normal manner.

As seen from the foregoing, the system operates particularly economically with respect to the water requirements to cool the lubricant by an off and on arrangement whereby the coolant is maintained within a preselected optimum operating range, the coolant flowing when the maximum temperature of the optimum range is reached and discontinuing the flow when a minimum temperature of the operating range is reached by the operation of the cooling system. The principal components of the system are mounted on panel 64 and are assembled thereon at the manufacturing plant and then shipped to the customer for installation with the gear reducer, only the connecting lines being required to make the final installation. The system can be readily adapted to various gear reducers and operating requirements over a wide range without changing the basic system.

While only one embodiment of the present cooling system for gear reducers has been described in detail herein, various changes and modifications may be made without departing from the scope of the invention.

I claim:

1. A cooling system for gear reducers having a housing with a lubricant therein, comprising a pump, a motor for driving said pump, a hot lubricant line for connecting said pump to the reducer housing, a heat exchanger, a pump outlet line connecting said pump to said heat exchanger, a return line connecting said heat exchanger to the reducer housing, a supply line connecting said heat exchanger to a source of coolant, a discharge line for said coolant from said heat exchanger, a control valve in said supply line, means for sensing the temperature in said hot lubricant line anterior to said pump and regulating the operation of the control valve in said coolant supply line, and a base structure supporting said pump, heat exchanger and connecting lines as a unitary assembly.

2. A cooling system for gear reducers as defined in claim 1 in which a second means for sensing the temperature in said hot lubricant line controls the power driving the speed reducer for shutting down the equipment in which the reducer is used in the event excessive temperatures are created in the gear reducer as indicated by the temperature of the lubricant.

3. A cooling system for gear reducers as defined in claim 1 in which a filter is disposed in said hot lubricant line anterior to said pump and a second filter is disposed in said return line.

4. A cooling system for gear reducers as defined in claim 1 in which said base structure supporting said pump, heat exchanger and connecting lines as a unitary assembly consists of a panel having the several components mounted rigidly thereon.

5. A cooling system for gear reducers as defined in claim 1 in which said means for sensing the temperature of the hot lubricant regulates said control valve for intermittent operation to maintain the lubricant within a preselected temperature range.

6. A cooling system for gear reducers as defined in claim 1 in which a by-pass line interconnects said pump outlet line with said return line and contains a relief valve therein.

7. A cooling system for gear reducers as defined in claim 6 in which a second means for sensing the temperature in said hot lubricant line controls the power driving the speed reducer for shutting down equipment in which the reducer is used and the system in the event excessive temperatures are created in the gear reducer as indicated by the temperature of the lubricant.

8. A cooling system for gear reducers as defined in claim 7 in which a filter is disposed in said hot lubricant line anterior to said pump and a second filter is disposed in said return line posterior to the connection with said by-pass line.

9. A cooling system for gear reducers as defined in claim 8 in which said base structure supporting said pump, heat exchanger and connecting lines as a unitary assembly consists of a panel having the several components mounted rigidly thereon.

10. A cooling system for gear reducers as defined in claim 9 in which said means for sensing the temperature of the hot lubricant regulates said control valve for intermittent operation to maintain the lubricant within a preselected temperature range.

* * * * *